United States Patent [19]

Schoofs

[11] Patent Number: 4,508,699

[45] Date of Patent: Apr. 2, 1985

[54] CLAUS PROCESS IMPROVEMENT

[75] Inventor: Richard J. Schoofs, Moraga, Calif.

[73] Assignee: Schoofs, Inc., Moraga, Calif.

[21] Appl. No.: 570,397

[22] Filed: Jan. 13, 1984

[51] Int. Cl.³ .............................................. C01B 17/04
[52] U.S. Cl. .................................. 423/574 R; 423/576
[58] Field of Search ................. 423/574 G, 574 R, 576

[56] References Cited

U.S. PATENT DOCUMENTS 4,097,585 6/1978 Fischer ............................ 423/574 R

OTHER PUBLICATIONS

"Choose Catalyst Objectively", Hydrocarbon Processing, Nov. 1974, by Robert A. Burns, Regis B. Lippert, and Richard K. Kerr.

Primary Examiner—Earl C. Thomas
Assistant Examiner—Jeffrey E. Russel
Attorney, Agent, or Firm—Limbach, Limbach & Sutton

[57] ABSTRACT

An improvement in the Claus Process for producing sulfur by reaction of hydrogen sulfide with sulfur dioxide at elevated temperature in the presence of a porous catalyst is described. The improvement lies in employing a porous catalyst, preferably alumina, having a large surface area at least 40% of which is provided by pores having diameters over the range 40 A° to 150 A° or having at least 20% of its surface area provided by pores having diameters over the range 80 A° to 150 A°.

3 Claims, 3 Drawing Figures

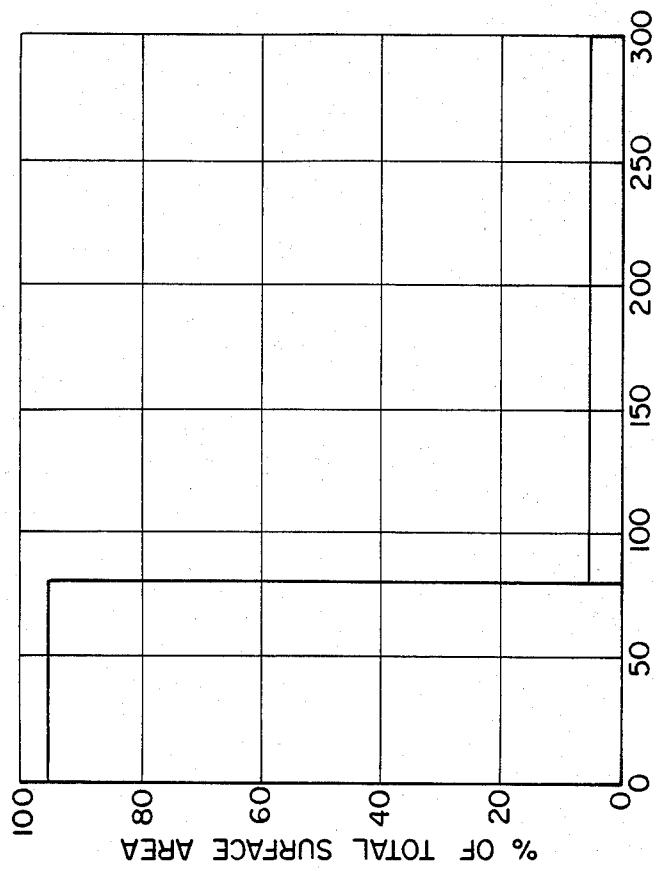
FIG.—1.
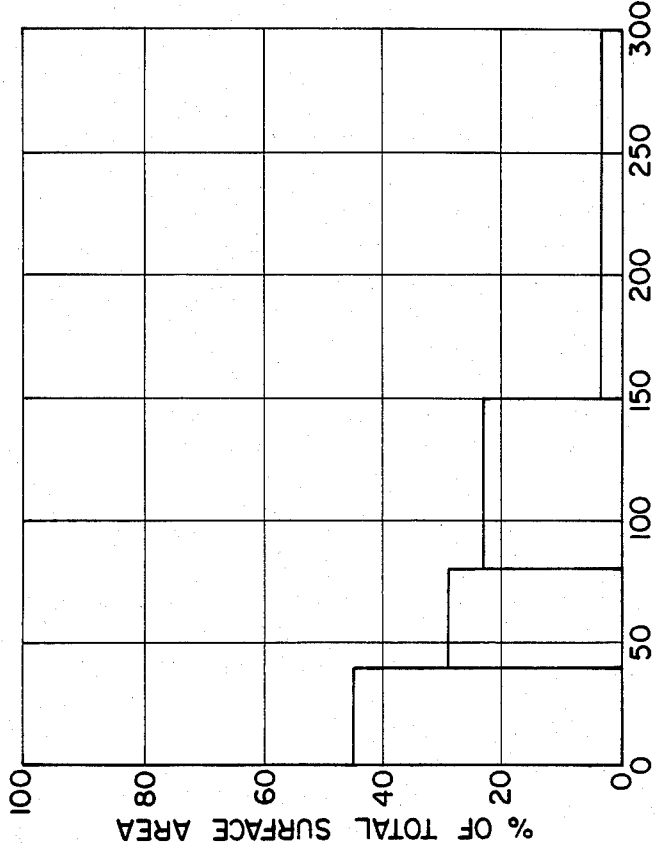
FIG.—2.
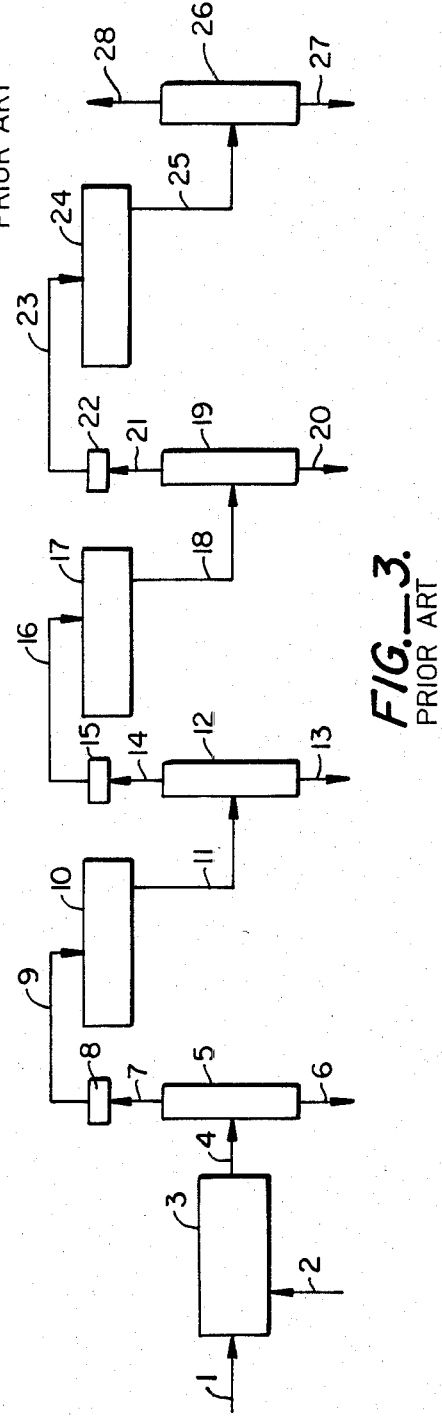
FIG.—3.
PRIOR ART

CLAUS PROCESS IMPROVEMENT

DESCRIPTION

1. Technical Field

The Claus Process is a process for recovering sulfur from hydrogen sulfide. In the practice of the process hydrogen sulfide rich gas and air are passed into a furnace where the hydrogen sulfide is partially burned to produce a mixture containing hydrogen sulfide and sulfur dioxide in a molar ratio of 2 to 1 and a large proportion of sulfur vapor. The gaseous mixture leaving the furnace is cooled to condense sulfur vapor which is removed as product. The uncondensed material is then reheated and passed into the first of a series of reaction vessels and there contacted with a porous catalyst which catalyzes the reaction between hydrogen sulfide and sulfur dioxide to produce elemental sulfur. The effluent from the first reaction vessel is passed through a condenser and cooled to separate elemental sulfur as a product. The uncondensed gaseous material leaving the first reaction vessel contains unreacted sulfur dioxide and hydrogen sulfide and this material is reheated and passed into a second reaction vessel where the gaseous mixture is again contacted with the porous catalyst adapted to catalyze the reaction between sulfur dioxide and hydrogen sulfide to form elemental sulfur. While the number of reaction vessels employed and specific flow arrangements in the process may vary, three serially connected catalyst filled reaction vessels are commonly employed. Sulfur recoveries are high, commonly being in excess of 96% of the sulfur contained in the hydrogen sulfide starting material.

Porous aluminum oxide is employed as the catalyst in Claus Process plants almost to the complete exclusion of other materials. The aluminum oxide is in the form of either bauxite or activated alumina, has a high surface area usually in excess of 200 square meters per gram and has a high pore volume, usually above 0.3 cc per gram. While the process has been improved in recent years, the improvements have been particularly directed to meeting stricter air quality standards. To this end steps have been taken to bring about almost complete reaction of the sulfur dioxide and hydrogen sulfide contained in the feed gas. There have, however, been few changes in the essential features of the alumina catalyst which is employed in the process except for impregnation with minor amounts of metals or mixing the alumina with minor amounts of other catalytically active materials.

BRIEF DESCRIPTION OF THE INVENTION

About 95% of the total surface area of the alumina catalysts currently used in the Claus Process is provided by pores having diameters less than 80 Angstrom units. It would appear that since surface area has been emphasized in the past as the primary requisite of a good Claus catalyst, it is understandable that the pore diameters of the catalysts currently in use are on the small side as smaller pore diameters generally tie in with larger total surface area. It has now been determined that the Claus catalysts currently in use which have a very large proportion of their surface area contributed by pores having diameters less than about 50 Angstrom units very rapidly lose a considerable proportion of their total activity when a fresh catalyst charge is first brought on-stream in a Claus reactor. This loss of total activity is due to the filling of a large proportion of the catalyst pores of diameters below about 50 Angstrom units with sulfur. Although each of the Claus reactors in a Claus plant is operated at a temperature above the sulfur dew point, the alumina catalyst absorbs sulfur vapor from the gases in the reactor and takes up additional sulfur from the gases by capillary condensation and both the absorption and capillary condensation result in the filling of a substantial proporation of the smaller than about 50 Angstrom catalyst pores with elemental sulfur.

Pursuant to the present invention, the Claus process is improved by employing as the catalyst a porous alumina having a large surface area at least 40% and preferably above 50% of which is provided by pores having diameters over the range of 40 Angstroms to 150 Angstroms and having a large pore volume provided by pores having diameters over the range 40 Angstroms to 150 Angstroms. The improved catalyst is generally characterized by having a content of pores with diameters in the range 80 to 150 A° which provides at least 20% of the total catalyst surface area.

DETAILED DESCRIPTION OF THE INVENTION

FIG. 1 of the appended drawings shows the proportion of total surface area of a catalyst of the invention which is provided by several ranges of pore diameters.

FIG. 2 of the drawings is a bar graph which represents the proportion of total surface area in relation to pore diameter which is found in the catalysts currently employed in the Claus Process.

FIG. 3 of the appended drawings is a simple flow sheet for a three reactor Claus Process as currently practiced.

FIG. 1 of the drawings is a block plot of surface area against pore diameter for a catalyst suitable for use in the practice of the invention showing that of the total catalyst surface area, 45% is contributed by pores having diameters less than 40 A°, 28% by pores having diameters from 40 A° to 80 A°, 23% by pores having diameters from 80 A° to 150 A° and 3% by pores having diameters from 150 A° to 300 A°.

While the catalyst of FIG. 1 is suitable for use pursuant to the invention, it is preferred to employ a catalyst having only a very minor proportion of pores smaller than 40 A° in diameter.

FIG. 2 of the drawings is a block plot of surface area against pore diameter for a representative Claus Process catalyst as disclosed by Burns et al in "Hydrocarbon Processing", Nov. 1974, showing that for such a catalyst 95% of its total surface area is contributed by pores having diammeters less than 80 A°.

The contrast between FIGS. 1 and 2 is striking. In the catalyst of the invention about 25% of its total surface area is contributed by pores having diameters greater than 80 A°, while the conventional Claus catalyst has only 5% of its total surface area contributed by such pores.

The catalysts of the invention, characterized by a lower proportion of pores having diameters smaller than 40 A° and by a larger proportion of pores in the 40–80 A° range than conventional Claus catalysts and having at least 20% of their total surfaces areas contributed by pores having diameters in the 80–150 A° range, have significant advantages over conventional Claus catalysts, e.g., a much smaller loss of total surface area very shortly after bringing the catalyst on stream, reduced filling of catalyst pores with sulfur by capillary condensation and longer on-stream periods between regeneration treatments.

A further advantage of the catalysts of the invention is that they permit operation of the catalyst containing reactors of the Claus plant at temperatures much closer to sulfur dew point than those used with conventional Claus catalysts. The above-dew-point temperatures are used with conventional catalysts to prevent sulfur condensation in the catalyst pores. The higher temperatures have an adverse effect on sulfur yield since the Claus reaction moves closer to completion at lower temperatures.

It is, of course, true that Claus catalysts currently in use get their job done notwithstanding loss of access of the feed gas to a large proporation of the total pore volume as a result of rapid filling of pores, especially those having diameters less than 40 A° with sulfur. This generally satisfactory performance is achieved because catalyst loading in the reaction vessels is so large that surface area remaining available to the feed gas after plugging of a large proportion of the smaller pores with sulfur is sufficient to provide the necessary catalyst function. With the catalyst of the present invention smaller amounts of catalyst will meet process requirements and make operation at higher space velocities possible. Further, when any of the reactors are operated at temperatures near or below the sulfur dew point the tendency of the catalyst pores to fill with sulfur as a result of capillary condensation is reduced, interruption of the process to desorb condensed sulfur is less frequent, and desorption of the condensed sulfur is accomplished more easily.

FIG. 3 of the appended drawings is a flow sheet for a conventional Claus Process plant.

Hydrogen sulfide and air are introduced into furnace 3 via lines 1 and 2, respectively. In the furnace, temperature and air/hydrogen sulfide ratios are controlled to produce a gas mixture which leaves the furnace through line 4 and passes into condenser 5. The gas leaving the furnace is a complex mixture containing $SO_2$, unconverted $H_2S$, COS, $CS_2$, $H_2O$, $CO_2$, $N_2$, $O_2$ and sulfur vapor.

The presence of COS, $CS_2$ and $CO_2$ in the gas is due to the fact that the usual $H_2S$ feed is recovered from hydrocarbon gases by solvent extraction and when adsorbed $H_2S$ is stripped from the solvent a small amount of hydrocarbon goes with it.

The gas effluent from furnace 3 is cooled in condenser 5 to condense sulfur vapor which is withdrawn as liquid through line 6. The uncondensed gases leave condenser 5 via line 7, are reheated in heater 8 and pass through line 9 into first converter 10 and there contact the Claus catalyst to catalyze the reaction of $H_2S$ and $SO_2$ to produce sulfur vapor and water vapor. First converter 10 is operated at temperatures usually in the range 300° C. to 350° C., as such temperatures are required to convert COS and $CS_2$ to sulfur. Reaction product leaves first converter 10 via line 11 and enters condenser 12 where sulfur vapor is condensed and removed as liquid via line 13. Uncondensed gas leaves condenser 12 via line 14, is reheated at heater 15 and is passed through line 16 into second converter 17 where it contacts Claus catalyst. Reaction product is withdrawn from converter 17 via line 18 and passed into condenser 19. Liquid sulfur is withdrawn from condenser 19 via line 20. Converter 17 is ordinarily operated at temperatures about 250°–270° C., since COS and $CS_2$ having been converted in high temperature first converter 10 and because the reaction between $H_2S$ and $SO_2$ goes farther in the direction of completion at lower temperatures.

Uncondensed gas leaves condenser 19 via line 21, is reheated by heater 22 and passes through line 23 into third converter 24. Third converter 24 is ordinarily operated at temperatures in the range 210°–230° C. to obtain maximum production of sulfur from $H_2S$ and $SO_2$.

After contacting Claus catalyst in third converter 24 gases are withdrawn via line 25 and passed into condenser 26 where sulfur vapor is condensed and withdrawn via line 27. Uncondensed gas is withdrawn via line 28. This tail gas has a minimal sulfur content and any additional treatment as by incineration and scrubbing is only to meet air quality regulations.

Each of the three converters 10, 17, and 24 shown in FIG. 3 is operated at temperatures generally within the ranges above indicated, but generally at a temperature 3 to 10 degrees Celsius above the sulfur dew point of the gas in the converter for the purpose of reducing liquid sulfur accumulation in the catalyst pores. Recently Heigold and Berkeley described a Claus process operation in which the last converter in the series was operated at a temperature below sulfur dew point (*Oil and Gas Journal*, Sept. 12, 1983, p. 156–160). The purpose is to take advantage of the higher conversions of $H_2S$ and $SO_2$ to sulfur which attend maintenance of lower temperature. In the process described a total of four converters were employed, each of the last two of the series was alternately onstream and in regeneration. While the third converter is on stream the catalyst in the fourth converter is reactivated by stripping sulfur deposited in the catalyst pores during its previous on stream period. During stripping of the catalyst in the fourth converter the pores of the catalyst in the third converter are filling with sulfur. After a time the operation of the third and fourth converters is switched, the fourth converter being put on stream and the catalyst in the third converter being subjected to a sulfur stripping step. The catalysts of the present invention can be used to great advantage in the process described by Heigold and Berkeley since their high content of pores of larger diameter than those of conventional Claus catalysts provides a greater capacity for liquid sulfur before reduction in activity to a degree requiring stripping sulfur would be reached. This permits less frequent switching of the functions of the third and fourth converters.

As indicated, the successive reactors generally operate at lower reactant partial pressures and at temperatures generally closer to the sulfur dew point. For example, whereas the first reactor may operate at 10°–15° C. above the sulfur dew point, a downstream reactor may operate at 3° C. or less above the sulfur dew point. To maximize the conversion to elemental sulfur it is desirable to assure the maintenance of high catalyst activity in the downstream reactors and this is facilitated by minimizing the capillary condensation of elemental sulfur. To this end it is advantageous to employ in a downstream reaction zone a porous alumina catalyst whose average pore diameter is larger than that of the porous alumina catalyst in the upstream reaction zone, and this is even more advantageous for those processes which operate a downstream reaction zone below the sulfur dew point. The larger average pore diameter is provided by employing a porous alumina catalyst generally corresponding in pore diameter distribution to the catalyst shown in FIG. 1 of the drawings.

Alumina catalysts having the pore diameter distributions of the catalysts of the present invention may be obtained from Aluminum Company of America which now provides controlled pore aluminas (CPA) having a variety of average pore diameters and pore diameter distributions.

Some presently available alumina Claus catalysts have been impregnated with small amounts of metals from groups IB, IIB, IIIB, IVB, VB, VIB, VIIB and VIII of the periodic table to provide resistance to sulfation, hydrogenation and hydrolysis activity and to use with feed gas streams containing nitrogen oxides as shown in U.S. Pat. Nos. 4,054,642, 4,097,585 and 4,283,380. The catalysts of the present invention may be impregnated with these or other materials when desired for these purposes without loss of the advantages above described.

I claim:

1. In a process for producing sulfur by contacting hydrogen sulfide and sulfur dioxide with a porous alumina catalyst at elevated temperature, the improvement which comprises employing as the catalyst, porous alumina in which at least forty percent of the surface area of the catalyst is provided by pores having diameters within the range 40 to 150 A°.

2. In a process for producing sulfur by contacting hydrogen sulfide and sulfur dioxide with a porous catalyst having a large surface area at elevated temperature, the imprpvement which comprises in the process a porous catalyst characterized by a proportion of its pores, having diameters within and throughout the range 80 to 150 A°, sufficient to provide at least 20% of the total surface area of the catalyst.

3. In a process for producing sulfur for contacting hydrogen sulfide and sulfur dioxide with a porous alumina catalyst at elevated temperature above the sulfur dew point in a first reaction zone, withdrawing the reaction mixture from the first reaction zone and separating it to obtain liquid sulfur and a gas comprising unreacted hydrogen sulfide and sulfur dioxide, contacting the separated gas with a porous alumina catalyst in a second reaction zone at an elevated temperature lower than the temperature employed in the first reaction zone and above the sulfur dew point, withdrawing the reaction mixture from the second reaction zone and separating it to obtain liquid sulfur and a gas comprising unreacted hydrogen sulfide and sulfur dioxide and contacting the separated gas with a porous alumina catalyst in a third reaction zone at an elevated temperature lower than that in the second reaction zone and below the sulfur dew point, the improvement which comprises employing as the catalyst in the third reaction zone porous alumina characterized by a proportion of its pores having diameters within and throughout the range 80 to 150 A° sufficient to provide at least 20% of the total surface of the catalyst.

* * * * *